United States Patent
Su (10) Patent No.: US 11,223,422 B2
(45) Date of Patent: Jan. 11, 2022

(54) METHOD AND APPARATUS FOR PROCESSING ETHERNET DATA IN OPTICAL NETWORK, AND SYSTEM

(71) Applicant: HUAWEI TECHNOLOGIES CO., LTD., Guangdong (CN)

(72) Inventor: Wei Su, Chengdu (CN)

(73) Assignee: Huawei Technologies Co., Ltd., Guangdong (CN)

(*) Notice: Subject to any disclaimer, the term of this patent is extended or adjusted under 35 U.S.C. 154(b) by 0 days.

(21) Appl. No.: 17/013,131

(22) Filed: Sep. 4, 2020

(65) Prior Publication Data

US 2020/0403698 A1 Dec. 24, 2020

Related U.S. Application Data

(63) Continuation of application No. PCT/CN2019/076905, filed on Mar. 5, 2019.

(30) Foreign Application Priority Data

Mar. 7, 2018 (CN) .......................... 201810187414.8

(51) Int. Cl.
*H04B 10/27* (2013.01)
*H04B 10/079* (2013.01)
*H04Q 11/00* (2006.01)

(52) U.S. Cl.
CPC ....... *H04B 10/27* (2013.01); *H04B 10/07953* (2013.01); *H04Q 11/0062* (2013.01); *H04Q 2011/0079* (2013.01)

(58) Field of Classification Search
CPC .. H04B 10/27; H04B 10/32; H04B 10/07953; H04Q 11/0062; H04Q 2011/0079
See application file for complete search history.

(56) References Cited

U.S. PATENT DOCUMENTS 10,979,209 B1* 4/2021 Sluyski ................. H04L 7/0075
2017/0005949 A1 1/2017 Gareau
(Continued)

FOREIGN PATENT DOCUMENTS

| CN | 101656588 A | 2/2010 |
|---|---|---|
| CN | 102196321 A | 9/2011 |
| CN | 102480408 A | 5/2012 |
| CN | 103297866 A | 9/2013 |
| CN | 103688499 A | 3/2014 |
| CN | 106411454 A | 2/2017 |
| EP | 3113502 A1 | 1/2017 |

OTHER PUBLICATIONS

Huawei Technologies Co., Ltd., "Text update proposal on Interoperability between FlexE Group UNI-N and Ethernet UNI-N interface ports," International Telecommunication Union, SG15-C.516, Geneva, Jan. 29-Feb. 9, 2018, 2 pages.

(Continued)

*Primary Examiner* — Dzung D Tran
(74) *Attorney, Agent, or Firm* — Fish & Richardson P.C.

(57) ABSTRACT

Embodiments of this application relate to the field of optical communications, and in particular, to a technology of processing data in an optical transport network. In a method for processing data, an optical network device extracts Ethernet data from a data frame of one path, converts the Ethernet data into another format, and places the Ethernet data converted into the another format into a data frame of another path. The optical network device is a destination device of the path and a source device of the another path. In addition, the optical network device further extracts overhead information from the data frame of the path, and inserts the overhead information into the data frame of the another path. The method for processing data provided in this application can implement interworking between different types of Ethernet interfaces. In addition, by using cross-path overhead processing, the method reduces path management complexity.

20 Claims, 9 Drawing Sheets

---

S301. An optical network device extracts Ethernet data from a data frame of a first path, converts the Ethernet data into another format, and places the Ethernet data converted into the another format into a data frame of a second path, where the optical network device is a destination device of the first path and a source device of the second path S302. The optical network device extracts overhead information from the data frame of the first path, and inserts the overhead information into the data frame of the second path

(56) References Cited

U.S. PATENT DOCUMENTS

| | | | |
|---|---|---|---|
| 2017/0366255 A1* | 12/2017 | Sharma | H04Q 11/0005 |
| 2018/0034573 A1 | 2/2018 | Gareau et al. | |
| 2018/0076932 A1* | 3/2018 | Okada | H04L 1/0083 |
| 2019/0132049 A1* | 5/2019 | Cai | H04B 10/27 |

OTHER PUBLICATIONS

PCT International Search Report and Written Opinion issued in International Application No. PCT/CN2019/076905 dated May 17, 2019, 17 pages (with English translation).

Office Action issued in Chinese Application No. 201810187414.8 dated Feb. 1, 2021, 23 pages (with English translation).

Caia et al., "nx25G FlexO-FR frame format, overhead and multiplexing structure," FiberHome, International Telecommunication Union, SG 15-C.0066, Study Group 15, Study Period 2017-2020, Geneva, Jun. 19-30, 2017, 5 pages.

Caia et al., "nx25G FlexO bit rate, FEC and client mapping options for next generation Mobile Fronthaul Transport," International Telecommunication Union, SG 15-C.0065, Study Group 15, Study Period 2017-2020, Geneva, Jun. 19-30, 2017, 6 pages.

Extended European Search Report issued in European Application No. 19764123.6 dated Mar. 19, 2021, 11 pages.

Wang, Ed. et al., "Framework and Requirements for GMPLS-based Control of Flexible Ethernet Network; draft-wang-ccamp-flexe-fwk-01," Internet Engineering Task Force, Internet-Draft, Jul. 7, 2016, 8 pages.

* cited by examiner

S301. An optical network device extracts Ethernet data from a data frame of a first path, converts the Ethernet data into another format, and places the Ethernet data converted into the another format into a data frame of a second path, where the optical network device is a destination device of the first path and a source device of the second path S302. The optical network device extracts overhead information from the data frame of the first path, and inserts the overhead information into the data frame of the second path

METHOD AND APPARATUS FOR PROCESSING ETHERNET DATA IN OPTICAL NETWORK, AND SYSTEM

CROSS-REFERENCE TO RELATED APPLICATIONS

This application is a continuation of International Patent Application No. PCT/CN2019/076905, filed on Mar. 5, 2019, which claims priority to Chinese Patent Application No. 201810187414.8, filed on Mar. 7, 2018. The disclosures of the aforementioned applications are hereby incorporated by reference in their entireties.

TECHNICAL FIELD

Embodiments of this application relate to the field of optical communications, and in particular, to a technology of processing Ethernet data in an optical network.

BACKGROUND

Currently, an Optical Internetworking Forum (OIF) formulates a standard related to a technology of a flexible Ethernet (FlexE) interface. FlexE 1.0 stipulates that service transmission at different rates such as 10 G, n×25 G, and 40 G, is implemented by binding n 100 G physical links (PHY). This technology applies to short-distance scenarios such as data center device interconnection. For long-haul transmission of FlexE data, FlexE data may be carried and transmitted by using an optical transport network (OTN). A standard related to the FlexE data carried by the OTN is formulated by an International Telecommunication Union-Telecommunication Standardization Sector (ITU-T), and it is determined that FlexE service data is carried by an OTN container such as a flexible optical data unit (ODUflex). Specifically, a mapping manner used for mapping the FlexE service data to the ODUflex is an idle mapping procedure (IMP).

Before the FlexE interface is introduced, an OTN technology provides a standardized bearer mode for a conventional Ethernet (ETH) interface. Specifically, the ETH interface is mapped to the OTN container such as an optical data unit k (ODUk), by using a bit-synchronous mapping procedure BMP) or a generic mapping procedure (GMP). The FlexE interface and the Ethernet interface can be used to carry Ethernet data. Therefore, in an OTN network that supports the two types of interfaces, there may be a requirement for interworking between the two interfaces.

To meet the interworking requirement, in the current solution, format conversion is performed on a client-side interface of a first node or a last node on an OTN path, to convert interface data in one format into interface data in another format, and send the interface data. In this solution, a format conversion capability of the client-side interface needs to be planned and designed during network construction. If the format conversion capability of the client-side interface is not planned and designed during the network construction, the interconnection requirement cannot be met. Therefore, the solution is not flexible.

SUMMARY

In embodiments of this application, a method and an apparatus for processing Ethernet data, and a system are described, to improve flexibility of supporting interworking between a FlexE interface and an ETH interface.

According to a first aspect, an embodiment of this application provides a method for processing data in an optical network. The method includes:

extracting, by an optical network device, Ethernet data from a data frame of a first path, converting the Ethernet data into another format, and placing the Ethernet data converted into the another format into a data frame of a second path, where the optical network device is a destination device of the first path and a source device of the second path; and extracting, by the optical network device, overhead information from the data frame of the first path, and inserting the overhead information into the data frame of the second path.

In a possible design, a format of the Ethernet data is a flexible Ethernet (FlexE) service frame format, and the another frame format is another Ethernet data format other than the FlexE service frame format; or a format of the Ethernet data is another Ethernet data format other than a FlexE service frame format, and the another frame format is the FlexE service frame format.

In a possible design, a type of the data frame of the first path is a flexible optical data unit (ODUflex), and a type of the data frame of the second path is an optical data unit k (ODUk); a type of the data frame of the first path is an ODUk, and a type of the data frame of the second path is an ODUflex; or a type of the data frame of the first path and a type of the data frame of the second path each are an ODUflex.

The foregoing overhead insertion has a plurality of types, including direct insertion, insertion after a mathematical operation, insertion after buffering, and the like.

In a possible design, the extracting, by the optical network device, overhead information from the data frame of the first path, and inserting the overhead information into the data frame of the second path includes: extracting, by the optical network device, first overhead information from the data frame of the first path; and directly inserting, by the optical network device, the first overhead information into the data frame of the second path. Specifically, the first overhead information is a trail trace identifier, status information, or the like.

In another possible design, the extracting, by the optical network device, overhead information from the data frame of the first path, and inserting the overhead information into the data frame of the second path includes:

extracting, by the optical network device, second overhead information from the data frame of the first path;

obtaining, by the optical network device, third overhead information based on the second overhead information and data frame information of a third path, where the third path and the second path are reverse paths of each other; and directly inserting, by the optical network device, the third overhead information into the data frame of the second path.

Specifically, the second overhead information includes one or more of a backward defect indication (BDI) and a backward error indication (BEI). The data frame information of the third path includes check information and error indication information.

In another design, the method may further include one or more of the following overhead processing steps:

determining payload type information carried on the second path, and inserting the payload type information into the data frame of the second path, where the payload type information specifically includes a service type and a mapping manner;

performing data check on the data frame of the first path, to determine whether there is a bit error in the data frame of the first path;

calculating a data check value of a first data frame of the second path, and inserting the data check value into a second data frame after the first data frame; and extracting fourth overhead information from the data frame of the first path, placing the fourth overhead information into a buffer, and inserting fourth overhead information extracted from the buffer into the data frame of the second path, where the fourth overhead information is specifically one or more of protection switching indication information, delay measurement information, and general communication channel information.

It should be noted that in an actual application, the network device may select one or more of the foregoing plurality of designs based on a specific design.

According to a second aspect, an embodiment of this application provides an apparatus for processing data. The apparatus includes a processor and a memory. The processor is coupled to the memory, and the processor is configured to perform the method described in any one of the first aspect or the designs of the first aspect.

According to a third aspect, an embodiment of this application provides an apparatus for processing data. The apparatus includes a processor. The processor is coupled to a memory. The processor is configured to read an instruction in the memory, to implement the method described in any one of the first aspect or the designs of the first aspect.

According to a fourth aspect, an embodiment of this application provides an optical network system. The system includes a first device, a second device, and a third device. The second device includes the apparatus for processing data described in any one of the second aspect or the designs of the second aspect, the first device is a source device of the first path, and the third device is a destination device of the second path.

According to a fifth aspect, an embodiment of the present invention provides a computer storage medium, including an instruction. When the instruction is run on a computer, the computer is enabled to perform the method provided in any one of the first aspect or the designs of the first aspect.

According to a sixth aspect, an embodiment of this application provides a computer program product including an instruction. When the computer program product runs on a computer, the computer is enabled to perform the method provided in any one of the first aspect or the designs of the first aspect.

Compared with the prior art, the solutions provided in this application can implement data format conversion by using an intermediate device or network-side interfaces of a first node and a last node, and there is no need to plan and design a device interface capability in advance. This improves flexibility of interworking between a FlexE interface and an ETH interface. In addition, the intermediate device further performs integrated management on the two OTN paths by overhead processing. This reduces management complexity.

BRIEF DESCRIPTION OF DRAWINGS

The following describes in more details the embodiments of this application with reference to accompanying drawings.

DESCRIPTION OF EMBODIMENTS

A network architecture and a service scenario described in the embodiments of this application are intended to more clearly describe the technical solutions in the embodiments of this application, and do not constitute a limitation on the technical solutions provided in the embodiments of this application. A person of ordinary skill in the art may learn that the technical solutions provided in the embodiments of this application are also applicable to a similar technical problem as a network architecture evolves and a new service scenario emerges.

Figure 1:
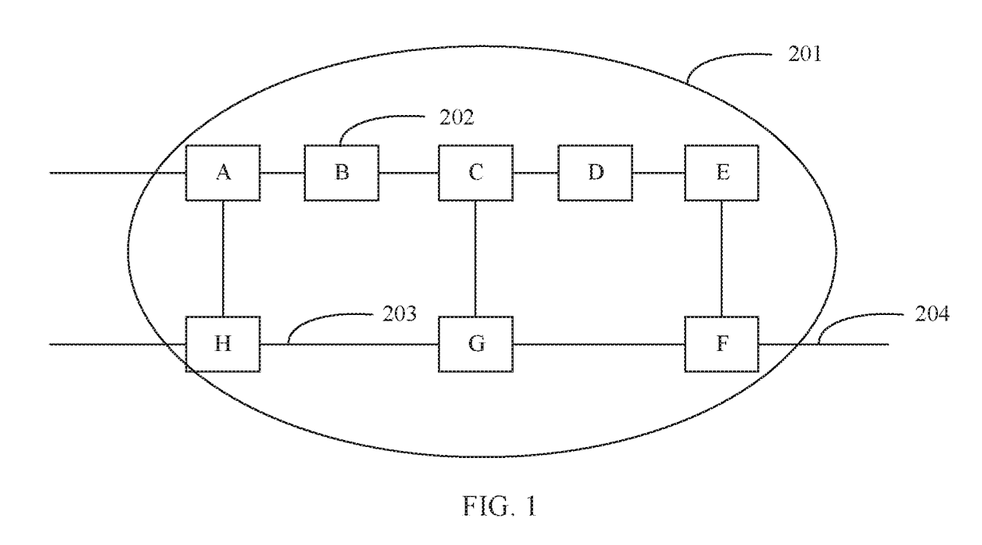
FIG. 1 is a schematic diagram of a possible application scenario according to an embodiment of this application.

The embodiments of this application are applicable to an optical network, for example, an optical transport network (OTN). A plurality of devices are usually connected by using an optical fiber to form an optical network, and different topology types such as a linear topology, a ring topology, and a mesh topology may be formed depending on a specific requirement. The optical network 201 in FIG. 1 is a mesh network including eight devices 202. 203 indicates an optical fiber. A client service interface indicated by 204 is configured to transmit client service data. One network may have a plurality of client service interfaces 204. Sometimes, the client service interface is also referred to as a user network interface (UNI). The devices 202 may have different functions based on an actual requirement. Generally, optical network devices are classified into optical-layer devices, electrical-layer devices, and optical-electrical hybrid devices. The optical layer device is a device that is capable of processing an optical layer signal, for example, an optical amplifier (OA) or an optical add-drop multiplexer (OADM). The OA may also be referred to as an optical line amplifier (OLA), and is mainly configured to amplify an optical signal, to support a longer transmission distance while ensuring specific performance of the optical signal. The OADM is configured to perform space transformation for an optical signal, so that the optical signal may be output from different output ports (which sometimes are also referred to as directions). Based on different capabilities, OADMs may be classified into a fixed OADM (FOADM), a reconfigurable OADM (ROADM), and the like. The electrical-layer device is a device that is capable of processing an electrical-layer signal, for example, a device that is capable of processing an optical data unit (ODU) signal. The optical-electrical hybrid device is a device that is capable of processing both an optical-layer signal and an electrical-layer signal. It should be noted that, based on a specific integration requirement, the optical network device may integrate a plurality of devices with different functions. This application is applicable to optical network devices of different forms and integration levels. Unless otherwise specified, a device that is subsequently mentioned in this application and that implements the technologies disclosed in this application includes at least a capability of processing the electrical-layer signal.

Figure 2:
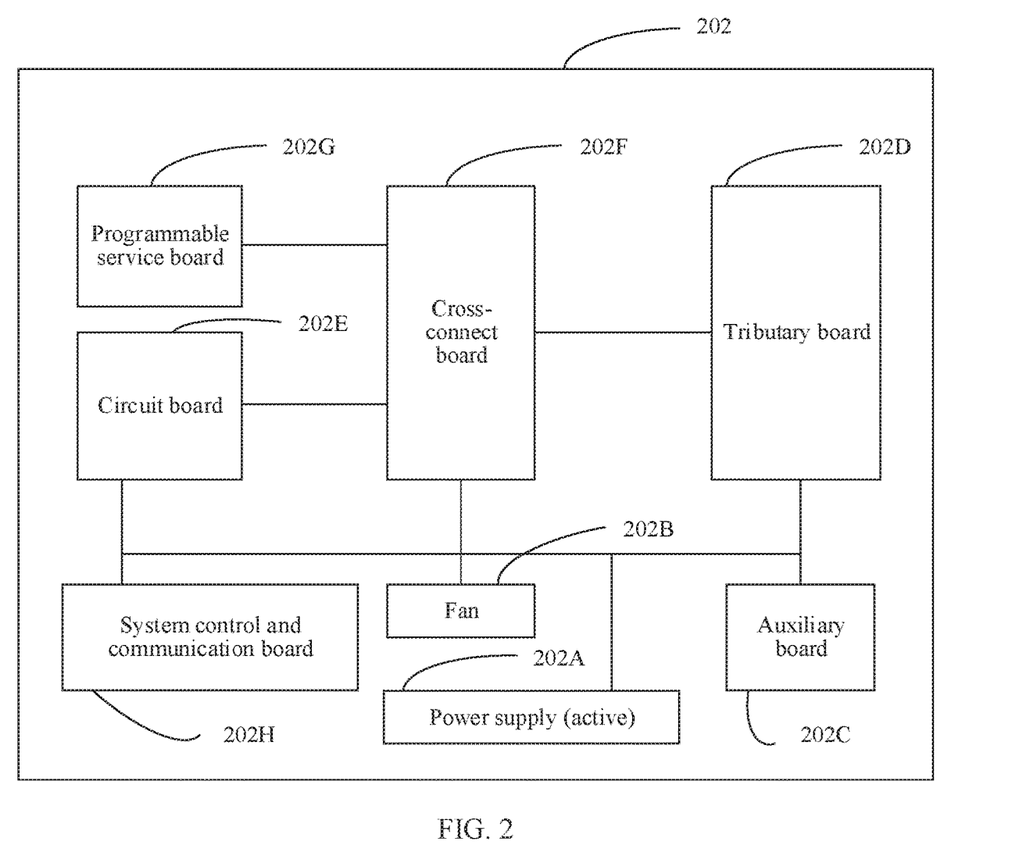
FIG. 2 is a schematic diagram of a possible hardware structure of a network device.

FIG. 2 is a schematic diagram of a hardware structure of an optical network device 202. Specifically, the device 202 includes a power supply 202A, a fan 202B, and an auxiliary board 202C, and may further include a tributary board 202D, a line board 202E, a cross-connect board 202F, and an optical-layer processing board (not shown in FIG. 2), a programmable service board 202G, and a system control and communication board 202H. It should be noted that, based on a specific requirement, one device 202 may specifically include different types and quantities of boards. For example, a network device serving as a core node may not have the tributary board 202D. A network device serving as an edge node may have a plurality of tributary boards 202D. The power supply 202A is configured to supply power to the device, and may include an active power supply and a standby power supply. The fan 202B is configured to dissipate heat for the device. The auxiliary board 202C is used to provide an auxiliary function, for example, provide an external alarm or access an external clock. The tributary board 202D, the cross-connect board 202F, the line board 202E, and the programmable service board 202G are mainly configured to process an electrical-layer signal (for example, an ODU frame in an OTN) of an optical network. The tributary board 202D is configured to receive and send various client services, for example, a synchronous digital hierarchy (SDH) service, a packet service, an Ethernet service, and a fronthaul service. Further, the tributary board 202D may be divided into a client-side optical module and a processor. The client-side optical module may be an optical transceiver, and is configured to receive and/or send a client signal. The processor is configured to process mapping and demapping from the client signal to the ODU frame. The cross-connect board 202F is configured to switch the ODU frame, so as to switch one or more types of ODU signals. The line board 202E mainly processes a line-side ODU frame. Specifically, the circuit board 202E may be divided into a line-side optical module and a processor. The line-side optical module may be a line-side optical transceiver, configured to receive and/or send an ODU signal. The processor is configured to implement multiplexing and demultiplexing, or mapping and demapping processing on the line-side ODU frame. The programmable service board 202G is configured to implement the method for processing data disclosed in this application. The system control and communication board 202H are configured to implement system control and communication. Specifically, information may be collected from different boards by using a backplane, or a control instruction is sent to a corresponding board. It should be noted that, unless otherwise specified, there may be one or more specific components (for example, a processor). This is not limited in this application. It should be further noted that types of boards included in the device and specific function designs and quantities of boards are not limited in this embodiment of this application. Unless otherwise specified, a device subsequently mentioned includes at least the programmable service board 202G. It should be noted that the programmable service board 202G may also be integrated with another board into one board. A name of a board that is specifically used to implement the technology of processing data disclosed in this application is not limited in this application.

Up to now, there are two types of interfaces for carrying a MAC frame data stream of a media access control (MAC) layer, and the two types of interfaces correspond to different encapsulation manners. One is a conventional ETH interface, and the other is a FlexE interface. Each interface supports different rates. For example, the FlexE interface supports a plurality of rates such as 10 G, 25 G, 40 G, and 100 G. Similarly, the ETH interface supports different rates, such as 10 G, 25 G, and 100 G. The difference is that mapping paths of signals are different when the signals of the two interfaces are mapped to the OTN. Specifically, a signal of the FlexE interface is mapped to an ODUflex by using an IMP. Data of the ETH interface may be mapped to an ODUk or the ODUflex by using a GMP or a BMP. Therefore, when there are the two types of interfaces in the OTN, a service path may need to be established between the two different types of interfaces, so as to transmit the MAC frame data stream. The two types of interfaces have the different mapping paths. This may lead to some problems. For example, a data format needs to be converted. If the data format is not converted, interworking between the two interfaces cannot be implemented. In addition, because the two interfaces may have different mapping manners and different bearer containers, two paths are required to support transmission of one service. This makes service path management complex. Therefore, this application provides a technology of processing data. It should be noted that the technology is applied to any device on a path connected to two different interfaces. For example, in FIG. 1, a path connected to two different interfaces (to be specific, one FlexE interface and one ETH interface) is A-B-C-G-F. In this case, the technology of processing data can be implemented by any node of A, B, C, G, and F. It should be noted that, for a first node and a last node, namely, A and F, the technology of processing data is implemented on a network-side interface, instead of a client-side interface. The client-side interface refers to that the interface is directly connected to a client interface by using a link, and is usually located on the tributary board 202D shown in FIG. 2. The network-side interface refers to that the interface is directly connected, by using a link, to another network device that is also used for service transmission, and is usually located on the line board 202E shown in FIG. 2. The advantage of this method is that a capability of the client-side interface of the network device does not need to be planned in advance. When interworking between different Ethernet interfaces needs to be performed, a device that can provide a conversion capability in the network is used or a conversion capability is added to a required device in real time. This provides flexibility and reduces network upgrade cost. For a case in which the network-side interfaces of the first node and the last node support the technology of processing data, compared with the prior art, the network-side interface has an advantage: The network-side interface can support conversion requirements of different client-side interfaces on a same device. Different from that an intermediate device has the capability of processing data disclosed in this application, when the first node or the last node of the service has the capability, the first path does not pass through an optical fiber link in the network, and exists only inside the first node or the last node. It should be noted that the technology of processing data provided in this application may be further applied to another more complex scenario, for example, a scenario in which data conversion needs to be performed twice or more times. It should be further noted that one OTN container has a corresponding data frame format. Unless otherwise specified, in this application, the container and the data frame may be used alternatively.

Figure 3:
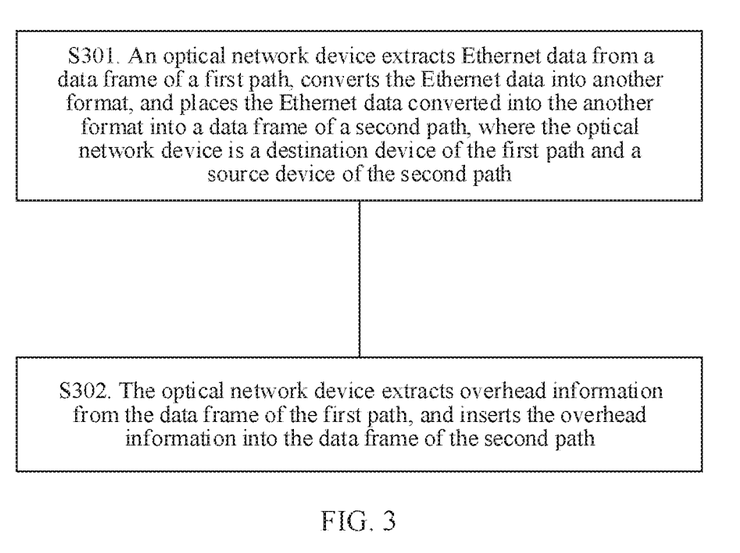
FIG. 3 is a schematic flowchart of a possible method for processing data.

FIG. 3 is a schematic flowchart of a possible method for processing data. In short, the method for processing data includes two steps: data processing or data conversion, and overhead processing. Specifically, the procedure includes the following steps.

S301. An optical network device extracts Ethernet data from a data frame of a first path, converts the Ethernet data into another format, and places the Ethernet data converted into the another format into a data frame of a second path, where the optical network device is a destination device of the first path and a source device of the second path.

Specifically, the optical network device may be an intermediate device, to support interworking requirements of a plurality of interfaces on different service paths. The first path and the second path are connected in series by using the optical network device, to transmit data on two different types of interfaces, to be specific, the two paths are connected in series to form one path that supports end-to-end data transmission. For example, the path is A-B-C-G-F, and a device B implements the technology of processing data. In this case, A-B forms a path, to be specific, the first path, used to carry the Ethernet data, and B-C-G-F forms another path, to be specific, the second path, used to carry the Ethernet data in another format.

The intermediate device processes the Ethernet data carried in a received optical network data frame, converts the Ethernet data into a target format, and places the converted Ethernet data into a to-be-sent data frame. It should be noted that the Ethernet data may be data in a FlexE interface format, or may be data in an ETH interface format. Correspondingly, the another format may be the ETH interface format or the FlexE interface format. This conversion enables a peer interface to correctly receive data and perform subsequent necessary data processing, for example, parse out a MAC frame data stream from the data.

S302. The optical network device extracts overhead information from the data frame of the first path, and inserts the overhead information into the data frame of the second path.

Specifically, the intermediate device needs to extract the overhead information from the data frame of the first path, and insert the overhead information into the data frame of the second path in a specific manner. The method is different from a conventional method, to be specific, the conventional method of independently generating overhead information for each path. This can reduce two paths to one path for management, and reduces management cost. It should be noted that the overhead information may include types of specific content, and insertion methods corresponding to the overhead information may be different, for example, direct insertion, insertion after a mathematical operation, and insertion after buffering. For specific content, refer to FIG. 6 and related descriptions thereof. Details are not described herein again.

Figure 4A:
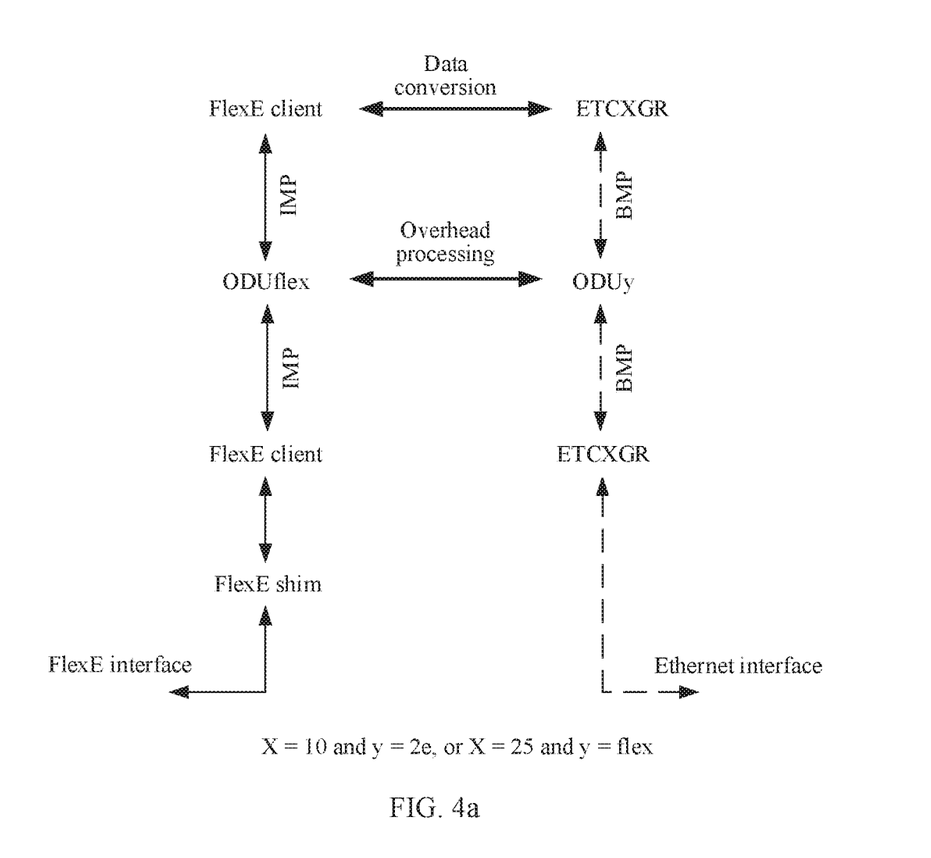
FIG. 4a is a possible schematic diagram of Ethernet data and overhead processing.
Figure 4B:
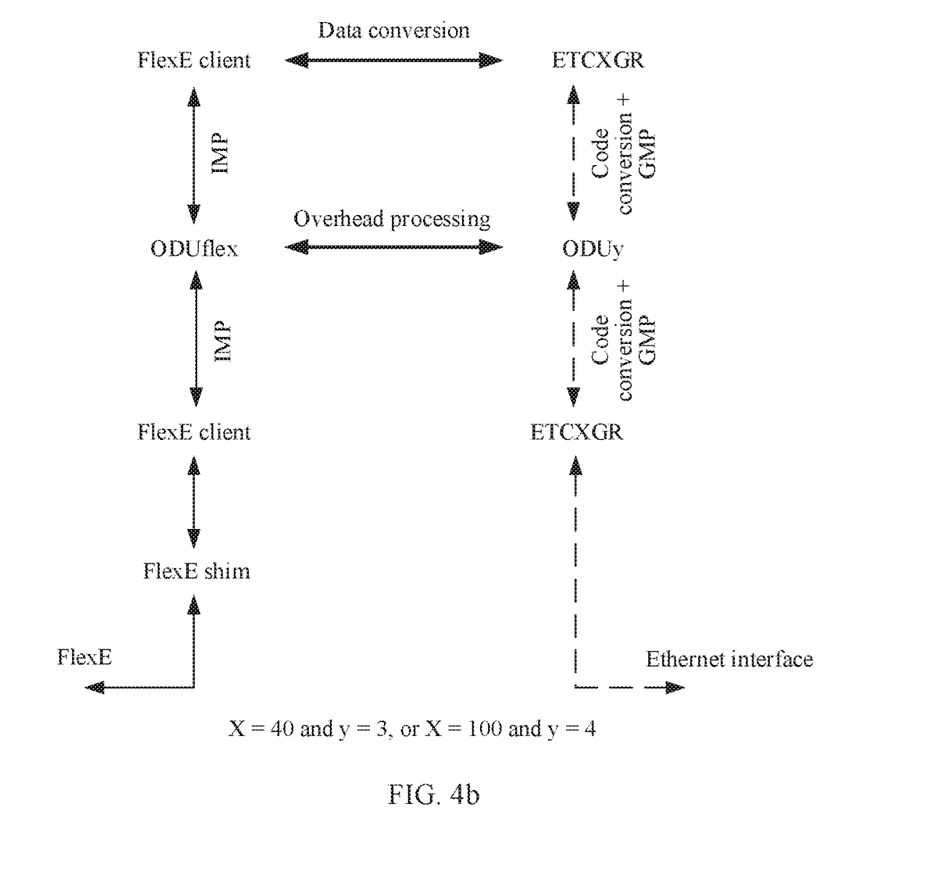
FIG. 4b is another possible schematic diagram of Ethernet data and overhead conversion.
Figure 4C:
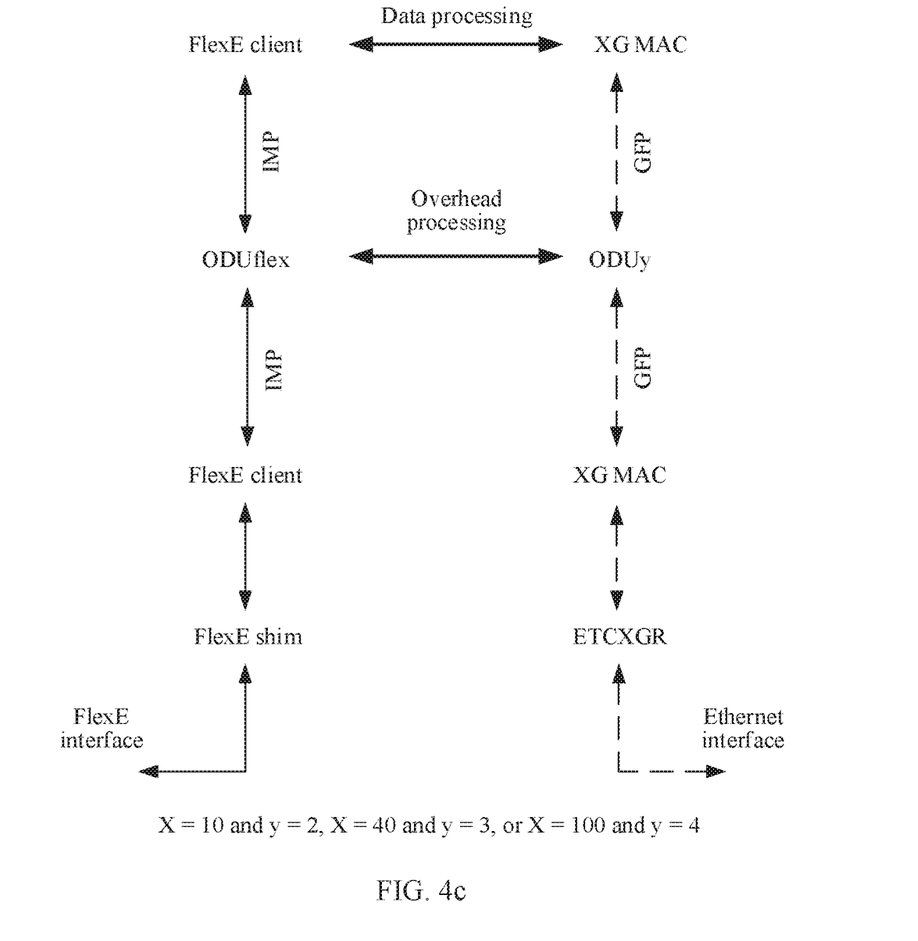
FIG. 4c is still another possible schematic diagram of Ethernet data and overhead conversion.

It should be noted that the foregoing two steps may be interchanged or performed simultaneously. For example, S302 is performed before S301. The following further discloses Ethernet data processing and overhead processing in the foregoing two steps for interface types of different rates. FIG. 4a to FIG. 4c provide four possible examples in which an intermediate device performs Ethernet data processing and overhead processing. It should be noted that these examples are also applicable to the foregoing scenario in which network-side boards of devices on a source node device and the last node have the capability for processing data disclosed in this application. It should be further noted that a rate of the FlexE client in FIG. 4a to FIG. 4c is not marked in FIG. 4a to FIG. 4c. Unless otherwise specified, the rate of the FlexE client is the same as a rate of a corresponding ETH interface. The same rates are not strictly equal, but are slightly different. For example, the rates of the ETH interface are respectively 10 Gbps, 40 Gbps, and 100 Gbps. Correspondingly, the rates of the FlexE client are respectively 10 Gbps, 40 Gbps, and 100 Gbps. It should be further noted that these specific interfaces and data formats are merely examples. Data processing provided in this application is applicable to a format that is currently used but is not shown, and a new Ethernet interface and data format that may appear subsequently.

FIG. 4a is a possible schematic diagram of Ethernet data and overhead processing. This example is applied to an interface at a rate of 10 G or 25 G. Specifically, a left part of FIG. 4a represents a FlexE interface and some operations on a data frame format of the FlexE interface. A FlexE Client is a data format of the FlexE interface. The signal may be a 66 b code block stream (where b represents a bit (bit)) defined in chapter 82 of the Institute of an Electrical and Electronics Engineers (IEEE) 802.3 standard. An ODUflex is an OTN container that carries the FlexE client. Specifically, an IMP is used for mapping a data frame of the FlexE Client to the ODUflex. A FlexE shim is an adaptation sub-layer at which a plurality of FlexE clients are multiplexed into n 100 G Ethernet physical links on a FlexE interface, and a corresponding basic frame format is a FlexE instance frame format. The FlexE shim may include a plurality of multiplexed FlexE instance frames. A right part of FIG. 4a represents the ETH interface. ETCXGR is a data format of the ETH interface. X is a variable, X=10 indicates that a rate of the interface is 10 Gbps, and a corresponding OTN container is ODU2 e (in other words, y=2e). X=25 indicates that a rate of the interface is 25 Gbps, and a corresponding OTN container is ODUflex (in other words, y=flex). A mapping manner is MTV The ETHXGR may use a 66 b code block stream defined in chapter 49 of the IEEE 802.3 standard.

Depending on a flow direction of data, conversion in FIG. 4a may be from the FlexE interface to the ETH interface, or from the ETH interface to the FlexE interface. The following separately describes specific operations of the intermediate device. It should be noted that the intermediate device receives the Ethernet data by using the OTN container and performs corresponding processing. FIG. 4a further includes a mapping/demapping process from the Ethernet interface to the OTN container, for example, the FlexE interface <=> FlexE shim <=> FlexE client <=> ODUflex, and a mapping/demapping process from the Ethernet interface to the OTN container, for example, the ETH interface <=> ETCXGR <=> ODUy. However, these processes are performed by the first node or the last node, and are omitted in subsequent specific explanation of operations of the intermediate device.

Conversion from the FlexE interface to the ETH interface: The intermediate device demaps the FlexE client from the ODUflex, and performs data conversion to form the ETCXGR, for example, an ETC10GR or an ETC25GR. Then, the intermediate device maps the ETCXGR to the corresponding OTN container, for example, the ODU2e or the ODUflex, in the BMP manner. In this way, the Ethernet data (to be specific, the FlexE client) is converted. In addition, the intermediate device further needs to extract a corresponding overhead from the received ODUflex, and insert the overhead into the corresponding OTN container obtained previously.

Conversion from the ETH interface to the FlexE interface: This process is a reverse process of the conversion from the FlexE interface to the ETH interface. In short, the ETCXGR is extracted from the ODUy, and is converted into a target format. The ETCXGR converted into the target format is placed into the ODUflex by using the IMP. In addition, similar processing needs to be performed on the overhead.

It should be noted that other processing, for example, scrambling processing, may further need to be performed when the FlexE Client or the ETCXGR is mapped to the OTN container. This is not limited in this application.

Similarly, FIG. 4b and FIG. 4c are other two possible schematic diagrams of Ethernet data and overhead processing. In FIG. 4b, rates are 40 G and 100 G, and a data format of an ETH interface is the same as that in FIG. 4a, namely, ETCXGR. In FIG. 4c, rates are 10 G, 40 G, and 100 G, and a data format of an ETH interface is a MAC frame data format. In FIG. 4b and FIG. 4c, operations of the intermediate device are similar to the foregoing explanation for FIG. 4a. A main difference is that one or more of the data format, rate, and mapping manner are different. The following separately provides explanations.

An operation of the intermediate node in FIG. 4b differs from that in FIG. 4a. First, rates of processed signals are different, the rate in FIG. 4b is higher, and corresponding mapping/demapping manners for the data format of the ETH interface are also different, and a GMP is used. Second, data processing is different. Specifically, in FIG. 4a, the intermediate device only needs to convert a 66 b code block stream in one format into a 66 b code block stream in another format. However, in FIG. 4b, the intermediate device needs to perform other processing, for example, an operation of deleting or adding an idle code block, and an operation of inserting or deleting alignment indication information. Specifically, an example in which the ETH interface is converted into the FlexE interface and X is 40 is used. The intermediate device parses an ODU3 to obtain an ETC40GR. Then, the intermediate device deletes the alignment indication information included in the ETC40GR, and inserts the idle code block, in other words, performs rate compensation or rate adaptation, to obtain a 40 G FlexE client. Finally, the intermediate device maps the FlexE client to the ODUflex by using the IMP. It should be noted that, before the idle code block is inserted, if scrambling processing is performed on the ETC40GR when the ETC40GR is carried in the ODU3 by using the ETH interface, correspondingly, the intermediate device further needs to perform descrambling processing.

Different from that the data format of the ETH interface in FIG. 4a and FIG. 4b is an Ethernet physical coding format (namely, the ETCXGR), the data format of the ETH interface in FIG. 4c is a MAC Ethernet data frame format. In other words, there are a plurality of data formats for the ETH interface. The following specifically describes an interface conversion process in FIG. 4c.

Conversion from a FlexE interface to an ETH interface: For data processing, an intermediate device first performs 66 b decoding processing on a FlexE client, to form a media independent interface (Media. Independent Interface, MII) interface data, performs processing such as adding or deleting an inter-frame gap, to convert the data into a corresponding MAC frame data stream, and maps the MAC frame data stream to the OTN container by using a GFP. FlexE clients at different rates correspond to different OTN containers. Specifically, a 10 G FlexE client corresponds to an ODU2, a 40 G FlexE client corresponds to an ODU3, and a 100 G FlexE client corresponds to an ODU4. In addition, similar to FIG. 4a and FIG. 4b, the intermediate device further needs to perform overhead processing.

Conversion from the ETH interface to the FlexE interface: This process is a reverse process of the foregoing conversion from the FlexE interface to the ETH interface. Specifically, the intermediate device performs processing such as adding or deleting an inter-frame gap on the MAC frame data stream, to form the MII interface data, and performs 66 b encoding on the MII interface data, to generate the FlexE client. Then, the intermediate device maps the FlexE client into the ODUflex by using the IMP. Similarly, the overhead also needs to be inserted.

In the solution provided in this application, data format conversion may be implemented by using the intermediate device, the client-side interface of the first node, or the client interface of the last node, and there is no need to perform planning and design in advance. This improves flexibility of implementing interworking between the FlexE interface and the ETH interface. In addition, the device for implementing data format conversion performs integrated management on the two OTN paths. This reduces management complexity.

It should be noted that, for the intermediate device, one or more of the data frame of the first path and the data frame of the second path may be directly transmitted by using an optical fiber. For example, if a data frame format of a path is an ODUk, the ODUk may be encapsulated into an OTUk format and then the data frame format in the OTUk format is sent by using an optical transmitter. Alternatively, one or more of the data frame of the first path and the data frame of the second path may be multiplexed to a path at a higher rate for transmission. For example, if a data frame format of a path is an ODU1 or an ODUflx, the ODU1 or the ODUflex may be encapsulated into an ODUk (for example, an ODU2, an ODU3, or an ODUCn) with a higher rate, and then the data frame format in the ODUk is sent.

The following further describes the embodiments of this application in detail based on some common aspects that are described above and that are applicable to this application. It should be noted that the terms "first", "second", and the like in this application are intended to distinguish between similar objects but do not necessarily indicate a specific order or sequence. It should be understood that the data termed in such a way is interchangeable in proper cases, so that the embodiments described herein can be implemented in other orders not described in this application.

An embodiment of this application provides a method and an apparatus for processing data, and a system. In this embodiment, the network scenario in FIG. 1 is used as an example. It is assumed that a transmit end device in this embodiment is A, a receive end device is F, and a device responsible for conversion is C. It should be noted that A, C, and F are merely examples, and may be replaced with other devices. In this embodiment, A and F support different types of UNI interfaces. For example, the device A supports the ETH interface, and the device F supports the FlexE interface.

Figure 5:
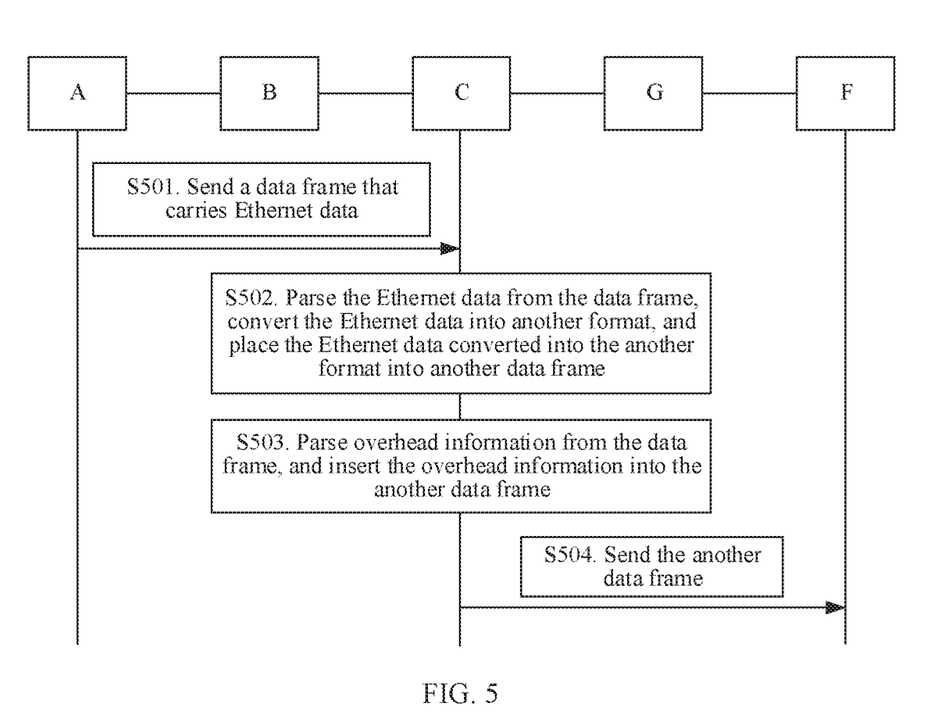
FIG. 5 is a schematic flowchart of a method for processing data according to an embodiment.

FIG. 5 is a schematic flowchart according to an embodiment. The following describes each step in detail.

S501. Send a data frame that carries Ethernet data.

Specifically, after obtaining the Ethernet data from a UNI interface, a device A encapsulates the Ethernet data into an optical network data frame and sends the optical network data frame. A format of the Ethernet data varies based on a format of the interface. For example, if the interface is a FlexE interface, the format of the data is a FlexE service frame format. For another example, if the interface is an ETH interface, the format of the data may be an Ethernet data format at a physical layer, for example, ETC10GR. Alternatively, the data may be in an Ethernet MAC frame data stream format.

It should be noted that, in this embodiment, the device A, a device B, and a device C form a path for transmitting the Ethernet data. The three devices are a first node (also referred to as a source node), an intermediate node, and a last node (also referred to as a destination node) of the path. In other words, the device A sends a data frame that carries the Ethernet data to a next device, namely, the device B.

S502. Parse the Ethernet data from the data frame, convert the Ethernet data into another format, and place the Ethernet data converted into the another format into another data frame.

S503. Parse overhead information from the data frame, and insert the overhead information into the another data frame.

Specifically, the two steps are performed by an intermediate device (namely, the device C). For specific descriptions of S502 and S503, refer to the descriptions of S301 and S302. Details are not described herein again.

S504. Send the another data frame.

Specifically, the step is also performed by the device C. The device C, a device G, and a device F form a second path. The device C is a first node on the second path, the device G is an intermediate node, and the device G is a last node.

It should be noted that the intermediate device B and the intermediate device G only forward the received data frame, and this action is not shown in FIG. 5. It should be further noted that, if a plurality of intermediate devices all have a conversion capability, a network management system or a control system is used in advance to select one device as a device for performing a conversion operation.

The data conversion explanations described in FIG. 4a to FIG. 4c are also applicable to this embodiment. Details are not described herein again. The following describes the overhead processing mentioned in S503. Overhead processing includes but is not limited to the following types: direct insertion, insertion after a mathematical operation, insertion after buffering, and the like. Direct insertion refers to that an overhead extracted from a data frame of a path is not processed, and is directly inserted into a data frame of another path. The insertion after the mathematical operation refers to that a mathematical operation (for example, an OR operation or a more complex operation) is performed on an overhead extracted from a data frame of a path in combination with one or more pieces of other information that may be obtained by an intermediate device, then a result of the operation is directly inserted into a data frame of another path. Insertion after buffering refer to that an extracted overhead is first placed into a buffer, and then the overhead is read from the buffer and inserted into a new data frame at proper time. In this way, a difference between rates or other formats in two different data frames can be adapted. It should be noted that a specific manner that may be used during overhead processing depends on a type included in a specific data frame. This is not limited in this application.

The following uses an example in which the data frame is an ODUk defined in a G.709 standard released in 2016 and formulated by the ITU-T, and the ODUk includes an overhead shown in Table 1. Table 1 further explains meanings of these overhead examples. It should be noted that a location and a length occupied by these overheads in the ODUk frame are not limited in this application, and may be defined with reference to a specification in the G.709 standard. It should be further noted that there are also the overheads shown in Table 1 in an ODUflex frame.

TABLE 1

| Name | Definition |
|---|---|
| | Definitions of overheads included in an ODUk/ODUflex |
| PM | Path monitoring: This overhead is used together with TCM, to provide an optical monitoring function for a plurality of layers of paths. Specifically, this overhead includes TTI, BIP8, BEI, BDI, STAT, and the like provided in Table 1. |
| TCM | Tandem connection monitoring: is used to provide a layer identifier for monitoring. |
| PT | Payload type: is used to provide payload information mapped to an OTN container, and may include information such as a service type and a mapping manner. |
| TTI | Trail trace identifier: is used to identify a path, and may include a source access point identifier, a target access point identifier, and information specified by an operator. |
| BIP8 | Bit-interleaved parity 8: is used for data check. |
| BEI | Backward error indication: is used to indicate whether there is a bit error on a path in a receiving direction. |
| BDI | Backward defect indication: is used to indicate whether there is a fault on a path in a receiving direction. |
| STAT | Status: is used to indicate path status information. |
| DM | Delay measurement: is used to measure a delay of a path. |
| APS/PCC | Automatic protection switching/protection communication channel: is used to provide protection-related overheads. |
| GCC | General communication channel: is used to transmit other protocol information, such as control and management protocol information. |

The following describes specific insertion manners of these overheads.

Figure 6:
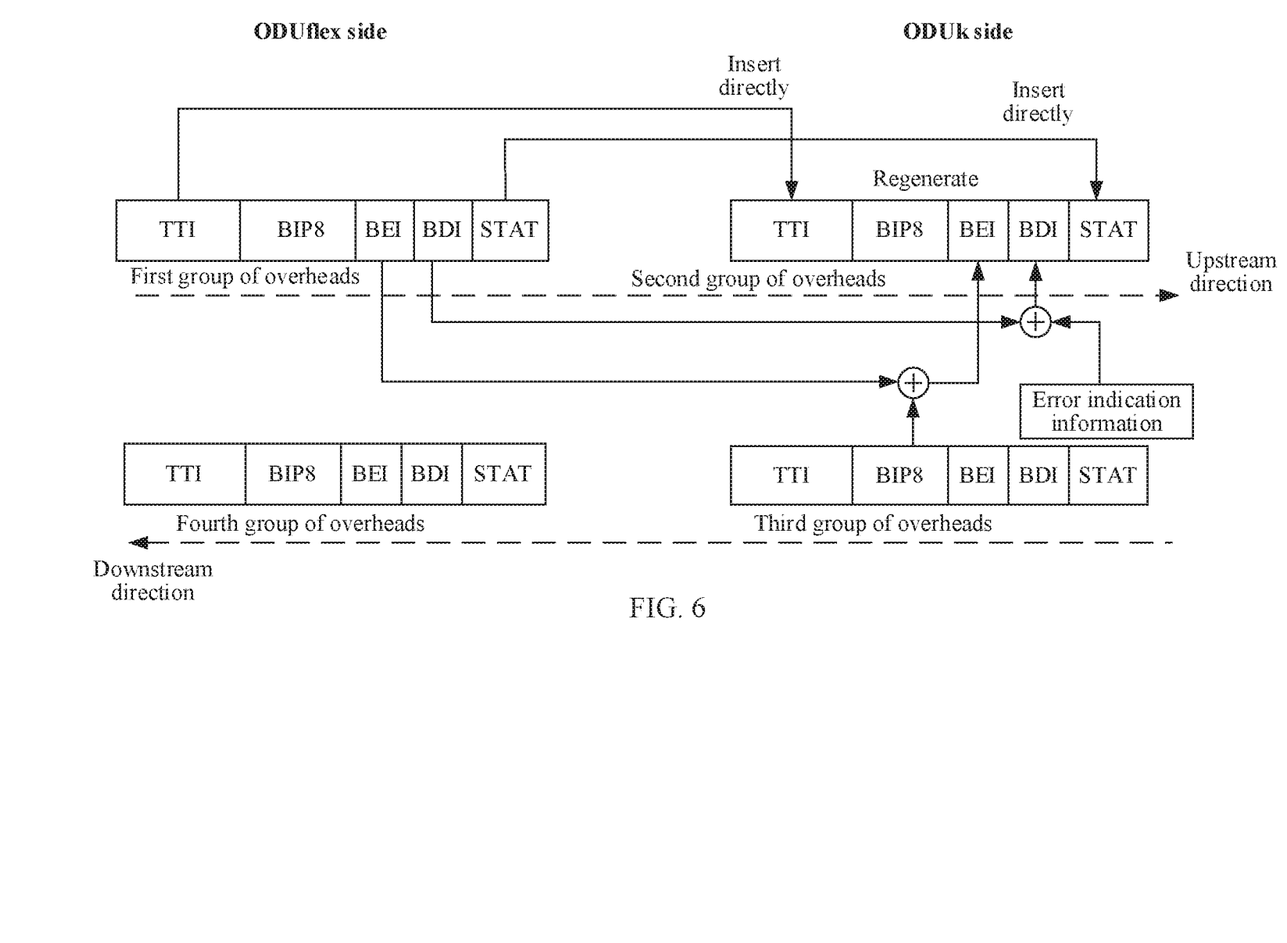
FIG. 6 is a schematic diagram of overhead processing according to an embodiment.

The PM and TCM overheads are used together to provide a monitoring function for different layers of paths, as shown in Table 1. In other words, each layer includes TTI, BIP8, BEI, BDI, and STAT overheads, and the like. FIG. 6 shows a specific overhead processing manner. It should be noted that, in an optical network, a service is usually bidirectional. In other words, if there is a path that carries a service from a device A to a device C, there is also a reverse path. To be specific, the path from the device C to the device A is used to carry reverse service transmission. Generally, the two paths that are mutually reverse pass through a same device. An uplink direction in FIG. 6 is from a FlexE interface to an ETH interface. A first overhead is some overheads that are included in an OTN container (an ODUflex is used as an example in FIG. 6) and that are received by the intermediate device, namely, some overheads included in a data frame of the first path. A second overhead is a corresponding overhead included in a data frame (an ODUk is used as an example in FIG. 6) to be sent by the intermediate device on the second path. Correspondingly, a downlink direction in FIG. 6 is a reverse direction of an uplink direction. A third overhead is data frame information obtained by the intermediate device in the downlink direction, and the information includes some overheads included in the received data frame or other locally obtained data frame information (for example, error indication information shown in FIG. 6). A fourth overhead is a corresponding overhead that needs to be included in a data frame on a corresponding next path. Specifically, the TTI overhead and the STAT overhead are directly inserted. To be specific, the intermediate device extracts the types of overheads from a data frame of a first path, and directly inserts the overheads into a data frame of a second path. The BEI and BDI are inserted after mathematical calculation. Specifically, the intermediate device needs to perform comprehensive processing on the received BEI information and a check result (for example, BIP8 information) in the third overhead in the downlink direction, to be specific, after performing "OR" processing, inserts the result into a BEI field in the second overhead. For the BDI, the intermediate device needs to perform comprehensive determining based on the BDI information extracted in the first overhead and the ODUk signal in the reverse direction. As shown in FIG. 6, if the error indication information indicates that there is a signal or frame loss alarm (for example, an ODUk-LOS, or an ODUk frame loss alarm LOF), it indicates that the ODUk signal in the reverse direction is lost, and the value of the BDI is 1. If there is no error indication information indicating that there is a signal or frame loss alarm, the extracted BDI information in the first overhead is directly inserted into a corresponding field in the second overhead. For the BIP8, the intermediate device needs to calculate a BIP8 check value of the received ODUflex frame, and compare the BIP8 check value with a received BIP8 overhead, to determine whether there are bit errors. Generally, a first node inserts a calculated BIP8 of a current frame into a BIP8 field of a subsequent frame of the current frame, for example, inserts a BIP value of a $k^{th}$ frame into a $(k+m)^{th}$ frame, where m is a positive integer not less than 1. Correspondingly, when performing BIP8 comparison, the intermediate device needs to select a corresponding frame from the received data frame to parse out a BIP8 value for comparison. In addition, as a first node on the second path, the intermediate device further needs to generate a BIP check value of an ODUk frame, and insert the BIP check value into a BIP8 field of another ODUk frame after the ODUk frame.

It should be noted that FIG. 6 shows only an example of processing the PM overhead in the uplink direction. Processing in the downlink direction is similar. Details are not described herein again.

Processing of other overheads in Table 1 is described as follows.

In this application, for the APS/PCC, the intermediate device first places the extracted APS/PCC overhead into a buffer, and then sequentially inserts the APS/PCC overhead into an APS overhead field or a PCC overhead field of the data frame of the second path according to a placement sequence (namely, a first-in first-out sequence). Similarly, the same operation is performed on the DM information. It should be noted that the DM information may be simple or accurate delay measurement information. A format and accuracy of specific information are not limited in this application. An advantage of this is that, regardless of whether data frames on the two paths are the same, there may be a difference in a frame frequency (or a frame rate). Therefore, the difference may be eliminated by using a buffer method. For the GCC, the processing method is similar to that of the APS/PCC. It should be noted that one OTN data frame may include a plurality of GCC fields, for example, including a GCC 1 and a GCC 2. For PT overhead processing, the intermediate device needs to fill in a PT value based on a service carried on the second path. In other words, in the data frame of the second path, for example, an ODUk or an ODUflex, the intermediate device inserts payload type information based on a converted data format. For example, an example in which a 10 G FlexE client Ethernet format is converted into an ETC10GR Ethernet format is used. A corresponding type of the data of the second path is an ODU2e. The intermediate device may insert 0x03 into a PT field in the ODU2e, to indicate that ETC10GR is carried by the OTN container, and a BMP mapping manner is used. In a reverse direction, to be specific, the ETC10GR format is converted to the FlexE client format, a value inserted by the intermediate device into a PT field in the ODUflex may be 0x1D, to indicate that FlexE client is carried, and an IMP mapping manner is used. Similarly, for another type of service carried in the OTN container, for example, for 25 G, 40 G, 100 G, or a higher rate, a unique value may be used to indicate payload type information. Certainly, a person skilled in the art may understand that the payload type information may be represented by using a plurality of fields. This is not limited in this application.

Figure 7:
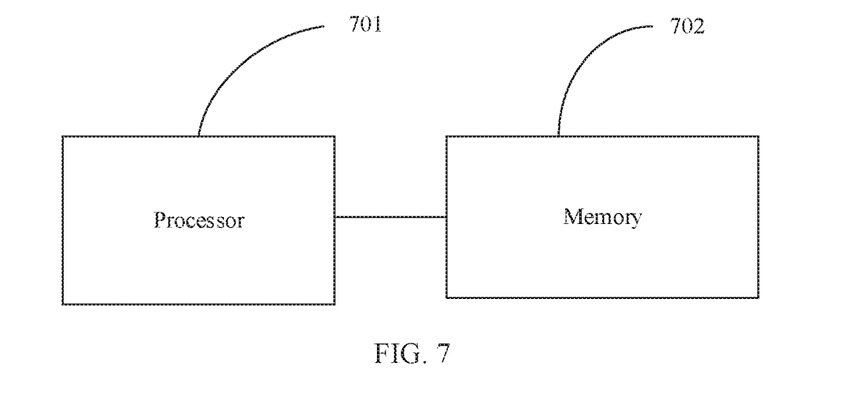
FIG. 7 is a possible schematic structural diagram of a network device.

FIG. 7 is a schematic structural diagram of a possible network device. The network device includes a processor 701 and a memory 702. The processor 701 is coupled to the memory 702. The memory 702 is configured to store a program instruction and data. It should be noted that the network device may be configured to implement data processing mentioned in FIG. 3 or FIG. 5, so as to implement interworking between different Ethernet interfaces. The following provides some examples. It should be further noted that the memory 702 is an optional component.

In a possible implementation, the network device is a device performing the steps shown in FIG. 3. The memory 702 stores a program instruction and data that support the step shown in FIG. 3, and the processor 701 is configured to perform the method step shown in FIG. 3. Optionally, the processing unit 701 may be further divided into, for example, a data processing unit and an overhead processing unit, which are respectively configured to perform the steps 301 and 302 shown in FIG. 3.

In another possible implementation, the network device is the device C in FIG. 5. Specifically, the processing unit 701 is configured to perform the steps 502 to 503 in FIG. 5. Optionally, the network device may further include an optical transmitter and an optical receiver, configured to send or receive an optical network data frame.

This embodiment of this application further provides a chip. A circuit for implementing a function of the processor 701 and one or more interfaces are integrated in the chip. When a memory is integrated into the chip, the chip may complete method steps in any one or more of the foregoing embodiments. When no memory is integrated into the chip, the chip may be connected to an external memory by using an interface, and the chip implements, based on program code stored in the external memory, an action performed by the network device in the foregoing embodiment.

It should be noted that the foregoing described executed actions are merely specific examples. For an action actually executed by the processor, refer to the action/step mentioned in the related description in FIG. 3 or FIG. 5. It should be further noted that the processor 701 and the memory 702 may be located in the programmable service board in the OTN hardware structure diagram shown in FIG. 2.

A person of ordinary skill in the art may understand that all or some of the steps of the embodiments may be implemented by hardware or a program instructing related hardware. The program may be stored in a computer-readable storage medium. The storage medium may include: a read-only memory, a random access memory, or the like. Specifically, for example, the foregoing processing unit or processor may be a central processing unit, a general-purpose processor, a digital signal processor (DSP), an application-specific integrated circuit (ASIC), a field programmable gate array (FPGA) or another programmable logical device, a transistor logical device, a hardware component, or any combination thereof. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When software is used to implement the embodiments, the method steps in the foregoing embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for processing data in an optical network, wherein the method comprises:
    extracting, by an optical network device, Ethernet data from a data frame of a first optical transport network (OTN) path, converting the Ethernet data into another Ethernet format, and placing the Ethernet data converted into the another Ethernet format into a data frame of a second OTN path, wherein the optical network device is a destination device of the first OTN path and a source device of the second OTN path; and
    extracting, by the optical network device, overhead information from the data frame of the first OTN path, and inserting the overhead information into the data frame of the second OTN path.

2. The method according to claim 1, wherein a format of the Ethernet data is a flexible Ethernet (FlexE) service frame format, and the another Ethernet format is another Ethernet data format other than the FlexE service frame format; or a format of the Ethernet data is another Ethernet data format other than a FlexE service frame format, and the another Ethernet format is the FlexE service frame format.

3. The method according to claim 1, wherein a type of the data frame of the first OTN path is a flexible optical data unit (ODUflex), and a type of the data frame of the second OTN path is an optical data unit k (ODUk); a type of the data frame of the first OTN path is an ODUk, and a type of the data frame of the second OTN path is an ODUflex; or a type of the data frame of the first OTN path and a type of the data frame of the second OTN path each are an ODUflex.

4. The method according to claim 1, wherein the extracting, by the optical network device, overhead information from the data frame of the first OTN path, and inserting the overhead information into the data frame of the second OTN path comprises:
    extracting, by the optical network device, first overhead information from the data frame of the first OTN path; and
    directly inserting, by the optical network device, the first overhead information into the data frame of the second OTN path.

5. The method according to claim 4, wherein the first overhead information comprises one or more of a trail trace identifier (TTI) and a state (STAT).

6. The method according to claim 1, wherein the extracting, by the optical network device, overhead information from the data frame of the first OTN path, and inserting the overhead information into the data frame of the second OTN path comprises:
    extracting, by the optical network device, second overhead information from the data frame of the first OTN path;
    obtaining, by the optical network device, third overhead information based on the second overhead information and data frame information of a third OTN path, wherein the third OTN path and the second OTN path are reverse paths of each other; and
    directly inserting, by the optical network device, the third overhead information into the data frame of the second OTN path.

7. The method according to claim 6, wherein the second overhead information comprises one or more of a backward defect indication (BDI) and a backward error indication (BEI).

8. The method according to claim 6, wherein the data frame information of the third OTN path comprises check information and error indication information.

9. The method according to claim 1, wherein the method further comprises one or more of the following steps:
    determining, by the optical network device, payload type information carried on the second OTN path, and inserting the payload type information into the data frame of the second OTN path;
performing, by the optical network device, data check on the data frame of the first OTN path, to determine whether there is a bit error in the data frame of the first OTN path;
calculating, by the optical network device, a data check value of a first data frame of the second OTN path, and inserting the data check value into a second data frame after the first data frame; and
extracting, by the optical network device, fourth overhead information from the data frame of the first OTN path, placing the fourth overhead information into a buffer, and inserting fourth overhead information extracted from the buffer into the data frame of the second OTN path.

10. The method according to claim 9, wherein the payload type information comprises a service type and a mapping manner.

11. The method according to claim 9, wherein the fourth overhead information is one or more of protection switching indication information, delay measurement information, and general communication channel information.

12. An apparatus for processing data, applied to an optical network device, wherein the apparatus comprises a processor and an optical transmitter, the processor is coupled to the optical transmitter, and the processor is configured to perform the following steps:
extracting Ethernet data from a data frame of a first optical transport network (OTN) path, converting the Ethernet data into another Ethernet format, and placing the Ethernet data converted into the another Ethernet format into a data frame of a second OTN path; and
extracting overhead information from the data frame of the first OTN path, and inserting the overhead information into the data frame of the second OTN path; and
the optical transmitter is configured to send the data frame of the second OTN path over the second OTN path.

13. The apparatus according to claim 12, wherein a format of the Ethernet data is a flexible Ethernet (FlexE) service frame format, and the another Ethernet format is another Ethernet data format other than the FlexE service frame format; or a format of the Ethernet data is another Ethernet data format other than a FlexE service frame format, and the another Ethernet format is the FlexE service frame format.

14. The apparatus according to claim 12, wherein a type of the data frame of the first OTN path is a flexible optical data unit (ODUflex), and a type of the data frame of the second OTN path is an optical data unit k (ODUk); a type of the data frame of the first OTN path is an ODUk, and a type of the data frame of the second OTN path is an ODUflex; or a type of the data frame of the first OTN path and a type of the data frame of the second OTN path each are an ODUflex.

15. The apparatus according to claim 12, wherein the processor is configured to perform the extracting overhead information from the data frame of the first OTN path, and inserting the overhead information into the data frame of the second OTN path, comprises the processor is configured to:
extract first overhead information from the data frame of the first OTN path; and
directly insert the first overhead information into the data frame of the second OTN path.

16. The apparatus according to claim 15, wherein the first overhead information comprises one or more of a trail trace identifier (TTI) and a state (STAT).

17. The apparatus according to claim 12, wherein the processor is configured to perform the extracting overhead information from the data frame of the first OTN path, and inserting the overhead information into the data frame of the second OTN path comprises the processor is configured to:
extract second overhead information from the data frame of the first OTN path;
obtain third overhead information based on the second overhead information and overhead information of a third OTN path, wherein the third OTN path and the second OTN path are reverse paths of each other; and
directly insert the third overhead information into the data frame of the second OTN path.

18. The apparatus according to claim 12, wherein the processor further performs one or more of the following steps:
determining payload type information carried by the second OTN path, and inserting the payload type information into the data frame of the second OTN path;
performing data check on the data frame of the first OTN path, to determine whether there is a bit error in the data frame of the first OTN path;
calculating a data check value of a first data frame of the second OTN path, and inserting the data check value into a second data frame after the first data frame; and
extracting fourth overhead information from the data frame of the first OTN path, placing the fourth overhead information into a buffer, and inserting fourth overhead information extracted from the buffer into the data frame of the second OTN path.

19. The apparatus according to claim 18, wherein the payload type information comprises a service type and a mapping manner.

20. An optical network system, wherein the system comprises a first device, a second device, and a third device, the first device is a source device of a first optical transport network (OTN) path, and the third device is a destination device of a second OTN path, the second device is configured to:
extract Ethernet data from a data frame of the first OTN path, converting the Ethernet data into another format, and placing the Ethernet data converted into the another format into a data frame of a second OTN path; and
extract overhead information from the data frame of the first OTN path, and inserting the overhead information into the data frame of the second OTN path.

* * * * *